United States Patent [19]

Black, Jr. et al.

[11] Patent Number: 4,558,389
[45] Date of Patent: Dec. 10, 1985

[54] CONTROL LOGIC SAFETY MONITORING CIRCUIT MEANS

[75] Inventors: Robert A. Black, Jr., Brooklyn Center; Rodney L. Clark, Burnsville; Kenneth B. Kidder, Coon Rapids; Paul B. Patton, Columbia Heights, all of Minn.

[73] Assignee: Honeywell Inc., Minneapolis, Minn.

[21] Appl. No.: 112,010

[22] Filed: Jan. 14, 1980

[51] Int. Cl.⁴ .............................................. H02H 3/20
[52] U.S. Cl. ....................................... 361/88; 361/78; 361/160
[58] Field of Search ...................... 361/88, 89, 79, 86, 361/159, 160, 170, 18

[56] References Cited

U.S. PATENT DOCUMENTS 3,663,958  5/1972  Crane ................................. 361/86 X
3,944,889  3/1976  Conway ................................. 361/89
4,016,459  4/1977  Boehringer ........................... 361/88
4,024,437  5/1977  Suzuki .................................. 361/18
4,127,887  11/1978  Tanaka et al. .................... 361/88 X
4,178,620  12/1979  Yu ..................................... 361/86 X Primary Examiner—Gene Z. Rubinson
Assistant Examiner—L. C. Schroeder
Attorney, Agent, or Firm—Alfred N. Feldman

[57] ABSTRACT

A microcomputer utilizing a crystal controlled clock and a power line responsive clock operates both the control system and into a safety timing means. The safety timing means can take the form of a pair of retrigerable monostable multivibrators that are operated to monitor the microcomputer along with a feedback circuit from a load control means. The feedback from the load control means senses the status of a safety switch means and provides the microcomputer with the ability to monitor and be monitored for safe operation.

11 Claims, 5 Drawing Figures

CONTROL LOGIC SAFETY MONITORING CIRCUIT MEANS

CROSS REFERENCE TO RELATED APPLICATIONS

The present application is related to a concept disclosed in an application filed on Nov. 9, 1979 having the Ser. No. 92,829, in the names of Robert A. Black and Gary A. Peterson, and also to a concept disclosed in an application filed on Nov. 26, 1979 having Ser. No. 097,471, in the names of Rodney L. Clark, Kenneth B. Kidder, and Gary A. Peterson. Both of the referenced applications are assigned to the assignee of the present application.

BACKGROUND OF THE INVENTION

With the advent of solid state control logic means such as microcomputers or microprocessors, a whole new field of control devices has evolved. When these devices are used in condition control or process control applications, the solid state control logic means or microcomputer ultimately controls electrical switching equipment, such as relays or heavy duty solid state switches. The ability of the microprocessor or microcomputer to carry out a large number of control functions in an exceedingly short period of time makes this type of device an ideal tool for monitoring and control of associated equipment. While the microcomputer or microprocessor operations entail possible failure modes that must be guarded against, they also provide an almost unlimited ability to monitor and control related equipment in fail safe manners not previously available in the control art.

In order to provide a degree of safety that is comparable with electromechanical types of devices, microprocessor or microcomputer type condition control systems must be operated with control routines that are significantly different than the mode of control applied to electromechanical of units. These routines form types of safety checking modes for the device. Specific safety checking circuits that dynamically check the switching circuits have been previously disclosed. These circuits rely on the control logic means or microcomputer and related circuitry external to the microcomputer for verifying dynamically that the load switching circuits have properly operated. These prior disclosed circuits do not check for safe operation of the microcomputer or control logic means itself. If a control logic means or microcomputer fails to operate in a proper manner, the external safety checking circuits are only of limited value. The control logic means itself must be rigidly checked for failure modes and for the transmission of signals in the form of "noise". When the load control circuits are checked by the microcomputer, and the microcomputer checks itself for proper operation, a new level of safety operation is made available.

SUMMARY OF THE INVENTION

The invention is directed to a safety type of circuit that is capable of monitoring a control logic means or microcomputer and safely shut down an entire system if there is a failure within the control logic means or within its peripheral safety circuitry.

A control logic means or microcomputer is operated with a pair of clocks that are continuously compared against each other. The first clock is a line voltage synchronized clock and the second clock is an internal crystal controlled clock that is used primarily for operation of the microprocessor or microcomputer logic. The control logic means continuously responds to the output of the two clocks and regularly triggers a dual retriggerable monostable multivibrator that acts as a safety timer means. The safety timer means continuously monitors the presence of an output pulse or clock pulse from the control logic means in order to continuously restart the safety timer means. The safety timing means also is capable of locking itself out in the event that a series of clock pulses are received too frequently thereby indicating that radio frequency or other types of electrical noise are passing through the system and falsely indicating the presence of control signals. An output of the safety timing means is used to drive part of a load control means including a switch or relay that has a normally open circuit configuration so that it can safely shut down the system in the event of a failure. The load control means feeds back a signal to the control logic means or microcomputer to verify the state of the output safety switch means. This output safety switch means is controlled in series with the power to the ultimate load thereby insuring that its shutdown shuts down the load in the event that the normal load switching means welds or fails to shut down the load when required to do so.

With the present circuitry, a pair of clocks compare or track one another and then activate a safety timing means. The safety timing means functions in conjunction with the clocks and the desired state of the load to provide a safety monitoring circuit means that substantially prevents a malfunction in the microprocessor, microcomputer or control logic means and its associated equipment from operating the ultimate load for the system in a manner which would be unsafe regardless of whether the failure is within the control circuit itself or is in the ultimate operation of the load means.

DESCRIPTION OF THE PREFERRED EMBODIMENTS

Figure 1:
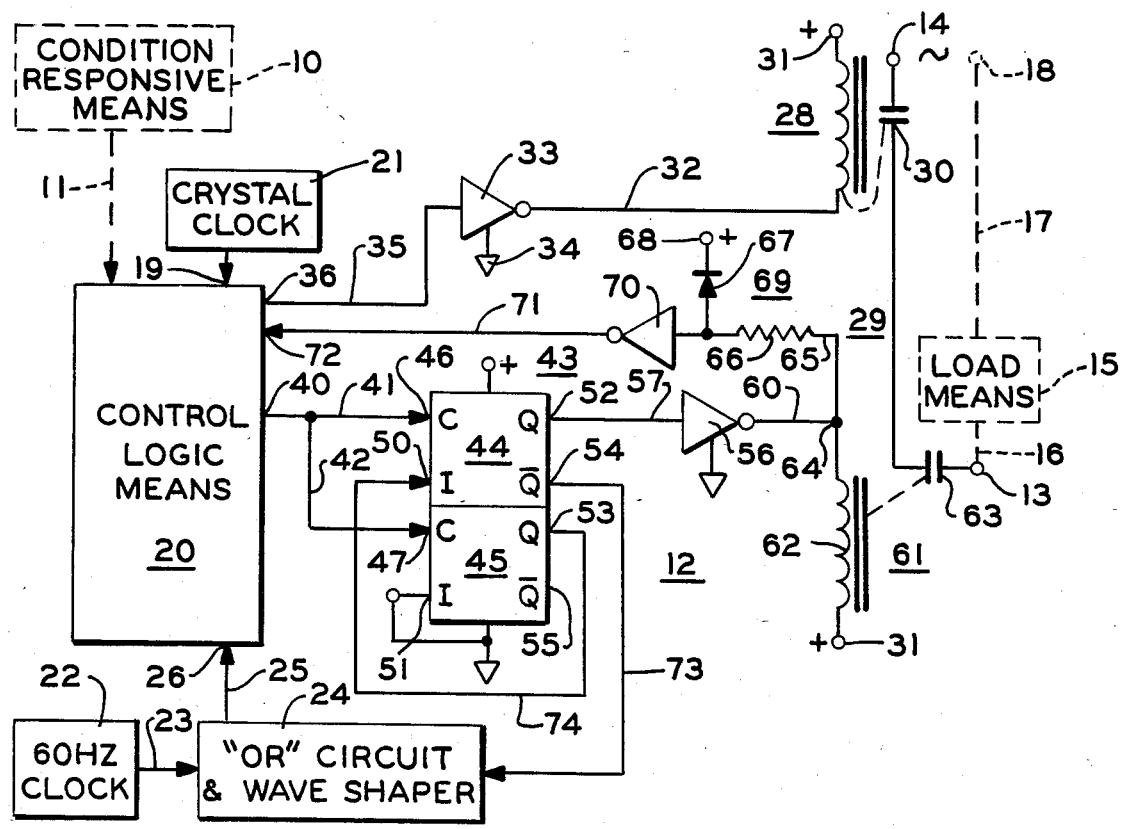
FIG. 1 is a block diagram of a complete control logic safety monitoring circuit.

The present invention is disclosed as being adapted to be connected in any type of condition responsive system. A condition responsive means 10 is adapted to be connected by means 11 to a control logic safety monitoring circuit means generally disclosed at 12. The monitoring circuit means 12 in turn is adapted to be connected at terminals 13 and 14 to any type of load means 15 by conductors 16 and 17. The conductor 17 is connected to a terminal 18 that in turn is connected to a source of alternating current potential. The load means 15 operates in response to the condition responsive means 10. The load means 15 could be any type of condition altering load means such as a fuel burner and its associated equipment, a heating and cooling system, a heat pump type of control system, or any other type of system in which the condition responsive means 10 controls the load means 15 to alter a condition. The system is also one in which the safe operation of the load means 15 is considered to be important.

The control logic safety monitoring circuit means 12 generally disclosed at 12 centers around a control logic means 20 that can be any type of programming or sequential type of control logic means such as a microcomputer, microprocessor, or a control logic means made up of discrete elements. The control logic means 20 receives the input means 11 from the condition responsive means 10 and is operated in response to a control logic clock means 21 that has been disclosed as a crystal controlled clock connected to a clock input port means 19 of the control logic means 20.

The control logic means 20 further operates in response to a power line responsive clock means 22 which has been disclosed as a 60 hertz clock that has an output means 23 connected to an OR circuit and wave shaper 24 that in turn is connected by means 25 to a control logic interrupt input port means 26. The power line responsive clock means 22 is sensed within the control logic means 20 and is compared against the input port 19 to properly sequence and synchronize the control logic means or microcomputer 20 in its operation.

The control logic means or microcomputer 20 has any number of load switch means that are generally disclosed at 28 as a relay and a normally open contact 30. While only one load switch means 28 has been shown, any number of relays and their contacts could be utilized in connection with the load means 15. Load switch means 28 forms part of a load control means 29. The load switch means 28 is energized from a source of potential 31 and is connected by conductor 32 to an inverting amplifier 33 that is grounded at 34 and connected by conductor 35 to a control logic output port means 36. Amplifier 33 includes an internal transient protection or free wheeling diode. When the control logic means or microcomputer 20 provides an appropriate output signal at port 36 the inverting amplifier 40 grounds the conductor 32 to energize the relay 28 to close the contact 30.

The control logic means or microcomputer 20 has a further output port 40 which is a clock output port that supplies a clock pulse on conductors 41 and 42 to a safety timing means generally disclosed at 43. The safety timing means 43 includes a dual retriggerable monostable multivibrator that is made up of two one-shot retriggerable monostable elements. The first of these elements is 44 while the second is 45. The monostable elements 44 and 45 have clock input terminals 46 and 47 to which the conductors 41 and 42 supply a clock pulse to initiate the operation of the safety timing means 43. Each of the elements 44 and 45 have provisions at 50 and 51 for the input of an inhibit signal. The presence of a potential at the inhibit inputs 50 and 51 prevent the elements 44 and 45 from clocking through pulses received at the clock inputs 46 and 47. Grounding of input 51 blocks its inhibit action. Each of the monostable multivibrator elements 44 and 45 have output terminals or means 52 or 53 along with complementary outputs 54 and 55. The outputs 52 and 53 have been indicated as Q outputs while the outputs 54 and 55 have been indicated as $\overline{Q}$ outputs. The elements 44 and 45 are conventional digital logic elements.

The output means 52 of element 44 is connected to an inverting amplifier means 56 by conductor 57. Amplifier 56 includes an internal transient protection or free wheeling diode. The output of the amplifier means 56 is connected by a conductor 60 to a safety switch means generally disclosed at 61. The safety switch means 61 in this particular embodiment includes a relay coil 62 and a normally open relay contact 63 that is operated by the current flow in the coil 62. The safety switch means 61 is energized from a source of potential 31. It is obvious that any time the inverting amplifier 56 provides a signal to ground the conductor 60, that the safety switch means 61 is energized to close the contact 63. It should be noted that at this point the normal state of operation of the overall system is with the contact 63 closed. The safety switch contact 63 opens only when the control logic means 20 or safety timer means 43 has detected an unsafe operation that requires the deenergization of the load means 15 during normal operation. Also, contact 63 opens once each operating cycle to verify that the contacts have not welded. The manner in which the safety switch means 61 is energized and monitored forms part of the present invention. The load switch means 28 and the safety switch means 61 form the load control means 29.

The conductor 60, at a junction 64, is connected to a further conductor 65, a resistor 66 and a diode 67 poled oppositely to a direct current source of potential 68. A junction of the diode 67 and the resistor 66 is connected to an inverting amplifier 70 that is connected by a conductor 71 to a control logic feedback input port means 72 of the control logic means 20. The resistor 66, diode 67 (and potential 68) along with the amplifier 70 and its circuit to the control logic means 20 at the port 72 forms a feedback logic means 69 which signals the control logic means or microcomputer 20 as to the potential at the junction 64 of the safety switch means 61. Changes in potential at the junction 64 are transmitted via the feedback logic means 69 to the logic feedback input port means 72 and are sensed by the control logic means 20 to monitor the status of the safety switch means 61.

The safety timer means 43 is completed by a conductor 73 that connects the output 54 or $\overline{Q}$ from the element 44 to the OR circuit or wave shaper 24 where any signal on the conductor 73 becomes part of a signal to the interrupt input port means 26 along with the power line responsive means 22. In the safety timer means 43, the inhibit terminal 51 of the element 45 is continuously powered by a potential as shown, while the inhibit input 50 of the element 44 is connected by a conductor 74 to the output 53 (the Q output) of the element 45. In this way the retriggerable monostable element 45 acts to control the actions of the monostable element 44.

Figure 2:
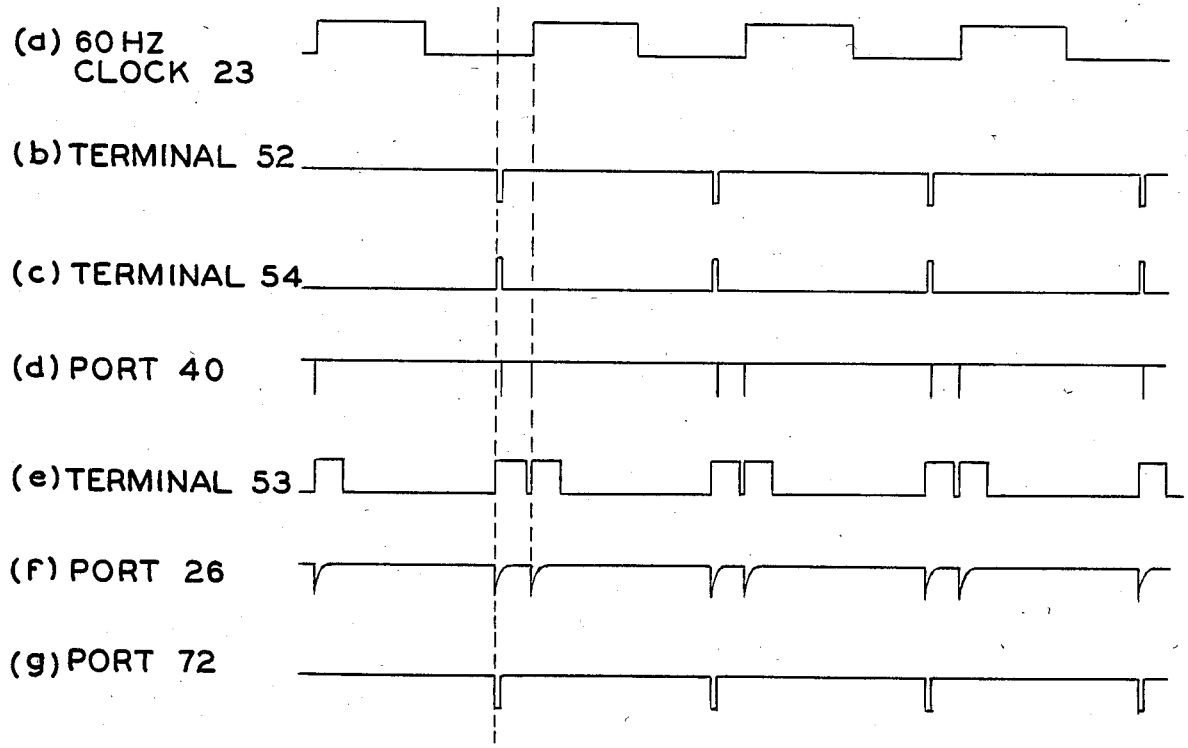
FIG. 2 is a series of wave forms of selected points within FIG. 1.

Before the operation of the circuit of FIG. 1 is described the wave shapes of the inputs and outputs of certain of the important portions of the circuit will be described in connection with FIG. 2. In FIG. 2 (a) the 60 hertz output on conductor 23 is shown. FIG. 2 (b) is the output voltage at terminal 52 of the element 44. FIG. 2 (c) is the output at terminal 54 of the element 44 and is the compliment of the voltage appearing at terminal 52. FIG. 2 (d) is the output clock pulse that appears at port 40 from the control logic means 20. FIG. 2 (e) is the output at terminal 53 of the element 45 showing the inhibit signal to the terminal 50 of the retriggerable monostable multivibrator element 44. The last of the disclosed wave forms is FIG. 2 (g) which is the input at the control logic means port 72 showing the feedback signal which verifies the state of the safety switch means 61.

OPERATION OF FIG. 1

In considering the operation of FIG. 1 it is first assumed that the overall device in which the control logic safety monitoring circuit means 12 is incorporated is in an "up and running" condition. In the up and running condition the condition responsive means 10 is controlling the operation of the relay contact 30 to energize and deenergize the load means 15. At that same time, the safety switch means 61 has closed the contact 63 so that the operation of the relay contact 30 provides the direct control of the load means 15.

The operation of the control logic monitoring circuit means 12 will be referenced to the seven wave forms disclosed in FIG. 2. The description of the operation of FIG. 1 will commence with the consideration of the 60 hertz clock or power line responsive clock means 22 going from a low to a high condition. This is the left most portion of the disclosed wave forms. As the clock pulse goes from the low to the high condition, the OR circuit and wave shaper 24 provides the interrupt port means 26 with a negative going pulse as disclosed in FIG. 2 (f). In normal operation, a negative going pulse is applied to the interrupt port means 26. After control logic means 20 executes its instructions (which takes a very short time) a negative going clock pulse is provided at the output trigger port means 40 (FIG. 2 (d)) to act as a clock pulse to the inputs 46 and 47 of the safety timer means 43. A clock pulse input at 46 causes the retriggerable monostable multivibrator element 44 to have a high output at the output means 52 to the conductor 57. The inverting amplifier means 56 inverts the signal and grounds the conductor 60 so that relay coil is grounded thereby maintaining an energized state to keep the contact 63 closed. The state of the voltage at the junction 64 is sensed by the feedback logic means 69 which includes the diode 67, the resistor 66 and the buffer amplifier 70. Under the conditions at this point in time, the voltage on the conductor 71 is high and the feedback port means 72 receives this high signal thereby advising the control logic means or microcomputer 20 that a proper voltage exists at the junction 64.

After approximately 13 milliseconds (a time selected by the resistance and capacitive components associated with the monostable multivibrator element 44) the multivibrator times out and the output at terminal 52 drops to a low level. The change in output states of the voltage at output 52 is simultaneously accompanied by a change in state in the voltage at output 54 of the element 44. The output at 54 immediately rises as the voltage at output 52 drops. A pulse output generated at 54 is conducted by the conductor 73 to the OR circuit and wave shaper 24 where a pulse is generated and supplied on conductor 25 to the interrupt port input means 26. The input pulse that is supplied to the interrupt port means 26 in response to the change in the output 54 of element 44 results in a clock pulse to be generated again at the trigger port means 40 to retrigger the clock inputs 46 and 47 of the elements 44 and 45. This immediately retriggers the monostable multivibrator elements 44 and 45 and returns the outputs 52 and 54 to the state they were in prior to the time that the retriggerable monostable multivibrator element 44 timed out at 13 microseconds. The pulse that was generated due to this action is conducted on the conductor 57 and is reflected at the junction 64 of the relay coil 62. The pulse caused the voltage at 64 to be removed for a very brief moment, but this removal was of such a short duration that the mechanical inertia of the safety switch means 61 did not allow the contact 63 to open. The momentary pulse is sensed by the feedback logic means 69 and is feed back through the amplifier means 70 and conductor 71 as a pulse to the feedback port means 72 where the pulse is read by the control logic means or microcomputer 20. The control logic means or microcomputer 20 verifies that the safety timing means 43 has functioned and that the safety switch means 61 has been checked and verified.

The occurrence of an input signal 26 does not automatically result in an output on 40. If the control logic 20 has detected a fault or an unsafe condition it ceases to output any signal on 40, regardless of any signal present on 26. The control logic also will deenergize the load by outputting the proper signal on 36. The control logic attempts to deenergize the load by direct command at output 36 or by refusing to retrigger the output 40.

At the time of the generation of the pulse that was created by the operation of the retriggerable monostable multivibrator element 44, a feedback circuit from the output 53 of the retriggerable monostable multivibrator element 45 is fed to the inhibit input 50 of element 44. This blocks the safety timer means 43 from receiving signals for some relatively short period of time. The period of time is selected by a resistance and capacitance combination in the monostable multivibrator element 45 and typically would be in the order of a couple of milliseconds. This disabling of the element 44 in receiving additional clock pulses is used to prevent a failure in the control logic means or microprocessor 20 from generating a continuous series of pulses to the clock input 46 of element 44 thereby falsely causing the safety timing means never to time out and provide its safety timing function.

Shortly after the timing out and restart of the retriggerable monostable multivibrator element 44, the system is retriggered by a clock pulse from the 60 hertz clock at the interrupt port means 26 thereby restarting the entire cycle. It will be noted that the time interval for timing out of the element 44 is shorter than the time interval for the power line responsive clock means 22 and that each operable cycle the system responds to a pulse generated by the power line responsive clock means and then responds to a pulse generated by the retriggerable monostable multivibrator 44 timing out. Both of these timings are being continuously monitored against the control logic means internal control logic clock means 21 which keeps the overall program of the control logic means 20 operating.

As will be noted in FIG. 2, the 60 hertz or power line responsive clock means 22 initiates the operation of the device and the system checks itself by the timing out of the safety timer means 43 which utilizes a monostable multivibrator configuration as a timing mechanism and further as a mechanism for blocking any clock pulses which might otherwise keep the safety means from operating properly. Each time the monostable multivibrator 44 times out and generates a pulse, that pulse is used to momentarily remove power from the safety switch means 61 to verify the ability of the system to drop out the safety switch contact 63, if necessary. This verification is checked by the feedback logic means 69 as a pulse on conductor 71 to the feedback port means 72 where the control logic means is capable of reading the momentary change in potential.

In the event that a component fails in any of the clock circuits, the change of flow of timed information within the control logic safety monitoring circuit means causes a safe shutdown of the load means by ceasing to clock timer 43, thereby allowing the opening of the safety switch means 61 (specifically in deenergizing the relay 62 and opening the contact 63) and at the same time deenergizing the load switch means 28. For example, the failure of the control logic means 20 to generate a clock pulse, allows the safety timer means 43 to time out and open the contact 63. The failure of either of the clocks 21 or 22 results in the loss of the clock pulse at the trigger port means 40 and the contact 63 is opened in response to the safety timing means 43. It is obvious that if the control logic means and its clocks are operating properly, but the safety timing means 43 ceases to function properly, that the control logic means 20 receives signals that do not correspond to the logic that has been built in to the control logic means 20 and the control logic means 20 can then deenergize the load means in a safe manner by the operation of the contact 30 or the contact 63.

Figure 3:
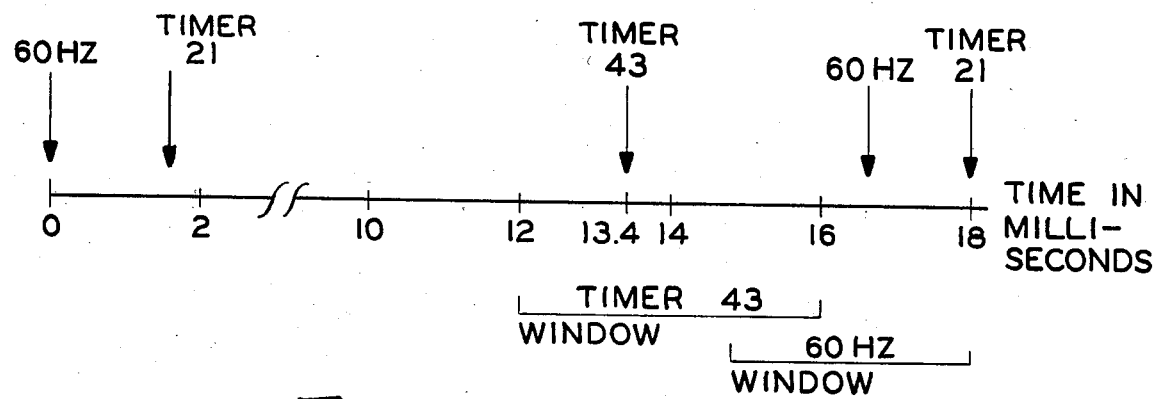
FIG. 3 is an expanded graph of a time cycle showing the relationship of the clocks in FIG. 1.

FIG. 3 discloses a graph of the time relationship between timer 43, timer 21, and 60 hertz. The graph shows a time interval of a total of 18 milliseconds referenced to a previous 60 hertz signal. The windows shown are the range of times allowed by the control logic means 20 in order to continue normal operation. If the corresponding events fall outside the windows shown, the control logic means 20 will take appropriate action, as described in the next paragraph. The timings disclosed are representative of a typical installation and are not a limitation. The timings selected were based upon the use of a power line responsive clock means 22 that was operated at 60 hertz and the timings can be varied depending on the types of clocks used and the precision of the types of components used in the system.

Figure 4:
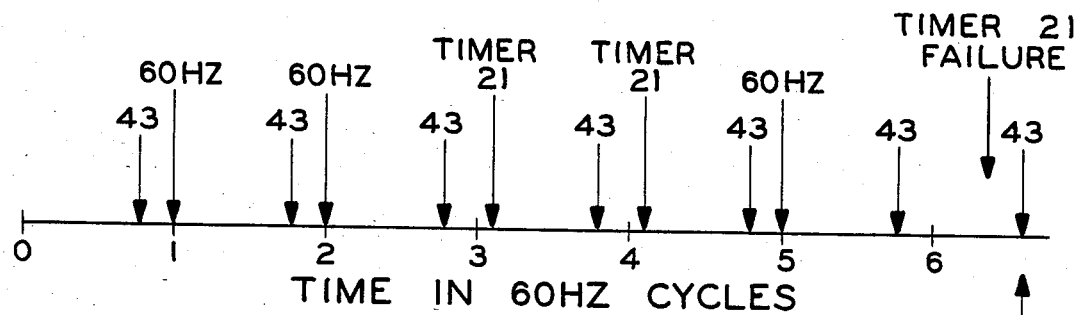
FIG. 4 is a graph of a time cycle showing normal operation and abnormal operational failures.

In FIG. 4 a graph is disclosed of a number of cycles of the power line responsive clock means or 60 hertz clock 22. This graph discloses what happens in the device under three separate sets of circumstances. Initially the graph shows two normal cycles and then discloses two cycles in which the power line responsive clock means 22 is missing. This might be a momentary loss of power line voltage. The graph then goes on to disclose what happens in the event that the timer means 21 ceases to function.

The initial two cycles disclosed in the graph of FIG. 4 are another way of representing the typical wave forms contained in FIG. 2. It discloses that the safety timer means functions, and then the power line responsive clock means functions. The cycle then repeats so that the first two cycles show the normal operation of the system. The graph then shows the missing of the power line responsive clock means 22 and the subsequent operation of the safety timer means 43 indicating that it had functioned. This type of operation can be utilized by properly constructing or programming the control logic means or microprocessor 20 to accept or recognize this type of a power line responsive clock failure without the system shutting down. This is simply a matter of programming the control logic means or microcomputer 20 to accept a specified number of power line cycles that can be missed without shutting down. The overall system is capable of bridging this type of power line failure due to the design of the power supply for the overall control system. Since it is undesirable to shut the system down if a couple of cycles of the power line responsive clock are missed, the control logic means or microcomputer 20 is programmed to continue for approximately two to four cycles in a typical piece of equipment.

The graph of FIG. 4 then goes on to disclose at cycle 5 the restoration of the power line responsive clock means 22 and the subsequent generation of a safety timer means output. The graph then shows the loss of the control logic clock means 21 which programs the control logic means or microcomputer 20 in its operating sequence. The loss of the control logic clock means 21 causes the system to shut down on safety when the safety timer means 43 provides its next output cycle. A safety timer shut down is accomplished by a removal of the ground of the amplifier 56 from the junction 64 thereby removing the conduction path for current in the safety switch means 61 and this allows the contact 63 to open. Since the contact 63 is in series with the load means 15, the load means 15 is deenergized regardless of this state of the contact 30. The selection of the number of cycles that can be missed and the timing (as exemplified by the graph of FIG. 4) can be selected depending on the type of equipment being controlled and the degree of safety required in its operation.

Figure 5:
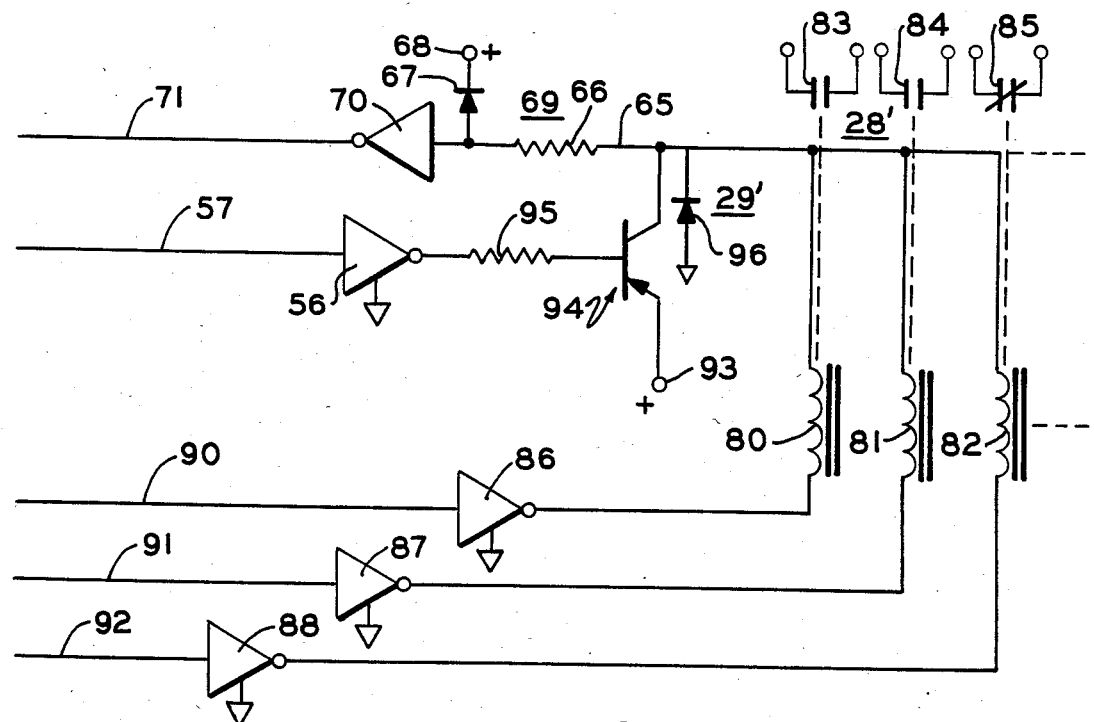
FIG. 5 is an alternate output circuit diagram for a further load control means.

FIG. 5 is an alternate embodiment of the load control means and has been identified as the load control means 29'. The feedback logic means 69 is provided again with the conductor 71, the amplifier 70, the diode 67, the resistor 66, and the source of power 68. The conductor 65 connects the feedback logic means 69 to a load switch means 28' that is made up of a plurality of relays 80, 81, and 82 which are associated with a normally open contact 83, a normally open contact 84, and a normally closed relay contact 85. The number of relays operated and the types and configuration of their contacts are obviously dictated by the type of control system and any number of relays and different types of contact configurations can be used. The relays 80, 81, and 82 are connected through buffer amplifiers 86, 87, and 88 by conductors 90, 91, and 92 to the control logic or microcomputer means 20. Each of the amplifiers 86, 87, and 88 include an internal transient protection or free wheeling diode. Their connection would be similar to the connection of conductor 35 to the port 36 as disclosed in FIG. 1. It is obvious that by causing any of the amplifiers 86, 87, or 88 to go low, that the relay associated with the particular amplifier would be energized if power is available on conductor 65.

Power is supplied to conductor 65 from a source 93 through a normally non-conductive solid state switch means generally disclosed at 94 as a transistor whose base is connected by a resistor 95 to the amplifier 56 of a circuit which would be comparable to that of FIG. 1. It is obvious that when the amplifier 56 is caused to ground the resistor 95 that the solid state switch or safety switch means 29' is driven from a non-conductive state to a conductive state thereby applying a potential on the conductor 65 so that the relays 80, 81, and 82 can be operated under the control of the control logic means or microcomputer 20. A diode 96 protects the solid state switch means 94 from switching transients.

The operation of FIG. 5 is sufficiently similar to that of FIG. 1 so only a couple of comments will be provided. The feedback logic means 69 again advises the control logic means or microcomputer 20 of the momentary operation of the safety switch means 94 which removes power from all the relays 80, 81, and 82. This feedback verifies the status of the power to the relays and is of a short enough duration so that the relays do not change state. The relays are individually controlled by the program or logic contained in the control logic or microcomputer means 20. The safety switch means 94 is again operated under the control of the amplifier 56 which responds to the safety timing means 43.

The circuitry used in the operation of microcomputers or microprocessors has become exceedingly complex and in order to effectively utilize this type of equipment in control applications a means for continuously monitoring the safety of the system is very desirable in general, and essential in certain applications. The application of a microprocessor or microcomputer to the operation of a system such as a flame safeguard or burner control system must provide a degree and level of safety equivalent to, or better than, the older electromechanical types of controls currently on the market. With this in mind the applicants have designed a control logic safety monitoring circuit means that provides for the control logic means or microcomputer means 20 to monitor both of the clock means, the feedback logic means and the safety timing means, while the safety timing means monitors the status of the control logic means or microcomputer. In order to describe this invention, a highly simplified disclosure has been presented which encompasses a few of the ways that portions of the system could be implemented. The implementation of the present invention could be carried out by the use of other specific components and the applicants therefore wish to be limited in the scope of the invention solely by the scope of the appended claims.

The embodiments of the invention in which an exclusive property or right is claimed are defined as follows:

1. Control logic safety monitoring circuit means adapted to be connected to condition responsive means to operate load control means wherein said safety monitoring circuit means monitors the safe operation of itself and of said load control means, including: control logic means having a plurality of input and output port means with said condition responsive means adapted to be connected to input port means; power line responsive clock means connected to control logic interrupt input port means and having a fixed frequency signal when power is being supplied to said safety monitoring circuit means; control logic clock means connected to a clock input port means of said control logic means and having a second fixed frequency signal to be utilized by said control logic means in controlling the operation of said control logic means; safety timer means connected to control logic means output trigger port means to receive a clock pulse to initiate the operation of said safety timer means; said safety timer means having first output means connected to operate safety switch means which has a normally non-conductive condition; said safety timer means having second output means connected to said control logic interrupt input port means; load switch means connected to further control logic output port means with said load switch means being controlled by said control logic means in response to said condition responsive means; said load switch means and said safety switch means being adapted to control load means; and feedback logic means connected from said safety switch means to control logic feedback input port means to enable said control logic means to verify the status of said safety switch means; said control logic means monitoring both of said clock means, said feedback logic means, and said safety timer means while said safety timer means monitors said control logic means.

2. Control logic safety monitoring circuit means as described in claim 1 wherein said control logic means is a microcomputer, and said control logic clock means includes a crystal controlled clocking signal.

3. Control logic safety monitoring circuit means as described in claim 2 wherein said power line responsive clock means includes means responsive to an alternating current power source.

4. Control logic safety monitoring circuit means as described in claim 3 wherein said safety timer means includes two monostable multivibrator means each having a clock input, an inhibit input, and two outputs which are complementary of each other; said clock inputs each receiving said clock pulse from said control logic means output trigger port means; and an output of a second of said monostable multivibrators connected to the inhibit input of a first of said monostable multivibrators to inhibit a change in said first and second outputs of said safety timer means in the event that said clock pulses are too frequent thereby indicating the failure of said control logic means.

5. Control logic safety monitoring circuit means as described in claim 4 wherein said control logic interrupt input port means includes an OR gate and wave shaper circuit means to combine said power line responsive clock means and said second safety timer output means.

6. Control logic safety monitoring circuit means as described in claim 5 wherein said load switch means includes a solid state switch to supply electrical power to a plurality of individual load means.

7. Control logic safety monitoring circuit means adapted to be connected to condition responsive means to operate load control means wherein said safety monitoring circuit means monitors the safe operation of itself and of said load control means, including: control logic means having a plurality of input and output port means with said condition responsive means adapted to be connected to input port means; power line responsive clock means connected to control logic interrupt input port means and having a fixed frequency output signal when power is being supplied to said safety monitoring circuit means; control logic clock means connected to clock input port means of said control logic means and having a second fixed frequency output signal utilized by said control logic means in controlling the operation of said control logic means; safety timer means connected to control logic means output trigger port means to receive a clock pulse to initiate the operation of said safety timer means; said safety timer means having first output means connected to operate safety relay means which has a normally open relay contact; said safety timer means having second output means connected to said control logic interrupt input port means; load switching means connected to further control logic output port means with said switching means being controlled by said control logic means in response to said condition responsive means; said load switching means being connected to carry electric current in series with said normally open safety relay contact and adapted to be connected to load means; and feedback logic means connected from said safety relay means to control logic feedback input port means to enable said control logic means to verify the status of said relay means; said control logic means monitoring both of said clock means, said feedback logic means, and said safety timer means while said safety timer means monitors said control logic means.

8. Control logic safety monitoring circuit means as described in claim 7 wherein said control logic means is a microcomputer, and said control logic clock means includes a crystal controlled clocking signal.

9. Control logic safety monitoring safety circuit means as described in claim 8 wherein said power line responsive clock means includes means responsive to an alternating current power source.

10. Control logic safety monitoring safety circuit means as described in claim 9 wherein said safety timer means includes two monostable multivibrator means each having a clock input, an inhibit input, and two outputs which are complementary to each other; said clock inputs each receiving said clock pulse from said control logic means output trigger port means; and an output of a second of said monostable multivibrators connected to the inhibit input of a first of said monostable multivibrators to inhibit a change in said first and said second outputs of said safety timer means in the event that said clock pulses are too frequent thereby indicating the failure of said control logic means.

11. Control logic safety monitoring safety circuit means as described in claim 10 wherein said control logic interrupt input port means includes an OR gate and wave shaper circuit means to combine said power line responsive clock means and said second safety timer output means.

* * * * *